US010599971B2

(12) United States Patent
Gaspari et al.

(10) Patent No.: US 10,599,971 B2
(45) Date of Patent: Mar. 24, 2020

(54) METHOD FOR PRODUCING CONDUCTING TRACKS ON A SUBSTRATE

(71) Applicant: GEMALTO SA, Meudon (FR)

(72) Inventors: Sébastien Gaspari, Gemenos (FR); Blandine Alleysson, Gemenos (FR); Elisabeth Kerguen, Gemenos (FR); Olivier Leveque, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 0 days.

(21) Appl. No.: 15/772,964

(22) PCT Filed: Nov. 14, 2016

(86) PCT No.: PCT/EP2016/077601
§ 371 (c)(1),
(2) Date: May 2, 2018

(87) PCT Pub. No.: WO2017/085023
PCT Pub. Date: May 26, 2017

(65) Prior Publication Data
US 2018/0330220 A1    Nov. 15, 2018

(30) Foreign Application Priority Data
Nov. 16, 2015   (EP) ..................................... 15306811

(51) Int. Cl.
*G06K 19/077*    (2006.01)
*H01Q 1/22*    (2006.01)
(Continued)

(52) U.S. Cl.
CPC ... *G06K 19/0779* (2013.01); *G06K 19/07779* (2013.01); *G06K 19/07783* (2013.01);
(Continued)

(58) Field of Classification Search
None
See application file for complete search history.

(56) References Cited

U.S. PATENT DOCUMENTS 9,123,996 B2 *   9/2015   Dokai ................... H01Q 1/2225
9,178,265 B2 *   11/2015   Hecker ............ G06K 19/07728
(Continued)

FOREIGN PATENT DOCUMENTS

EP          2 579 389 A1    4/2013
WO    WO 2008/011739 A1    1/2008

OTHER PUBLICATIONS

International Search Report (PCT/ISA/210) dated Feb. 15, 2017, by the European Patent Office as the International Searching Authority for International Application No. PCT/EP2016/077601.
(Continued)

*Primary Examiner* — Christle I Marshall
(74) *Attorney, Agent, or Firm* — Buchanan Ingersoll & Rooney PC

(57) ABSTRACT

Method of producing wire inlaid on a support and inlaid wire obtained. The invention relates to an antenna for radiofrequency transponder, said antenna comprising conducting wire portions which are to a major extent inlaid and conducting wire portions which are to a minor extent non-inlaid on a plane support. The antenna is characterized in that said wire portions which are to a minor extent non-inlaid extend over or cross at least one favoured fold line and/or one fold line predefined according to a standardized folding resistance test. The invention also relates to a portable electronic object comprising said antenna and a corresponding method of production.

15 Claims, 3 Drawing Sheets

Section A-A

(51) Int. Cl.
H01Q 1/38 (2006.01)
H01Q 7/00 (2006.01)

(52) U.S. Cl.
CPC ..... *G06K 19/07798* (2013.01); *H01Q 1/2225* (2013.01); *H01Q 1/38* (2013.01); *H01Q 7/00* (2013.01)

(56) References Cited

U.S. PATENT DOCUMENTS

| | | | |
|---|---|---|---|
| 2009/0229109 A1* | 9/2009 | Finn | G06K 19/07327 29/601 |
| 2009/0321531 A1 | 12/2009 | Speich | |
| 2010/0295683 A1* | 11/2010 | Yamazaki | H01L 27/1214 340/572.7 |
| 2013/0075134 A1* | 3/2013 | Finn | H01P 11/00 174/250 |
| 2013/0112754 A1* | 5/2013 | Ikemoto | G06K 7/10336 235/488 |
| 2013/0207874 A1* | 8/2013 | Hecker | H01Q 1/002 343/873 |
| 2014/0285395 A1 | 9/2014 | Alleysson et al. | |
| 2017/0040673 A1* | 2/2017 | Kanno | H01Q 1/243 |
| 2018/0076525 A1* | 3/2018 | Mikawa | H01Q 1/2225 |

OTHER PUBLICATIONS

Written Opinion (PCT/ISA/237) dated Feb. 15, 2017, by the European Patent Office as the International Searching Authority for International Application No. PCT/EP2016/077601.

* cited by examiner

Section A-A

METHOD FOR PRODUCING CONDUCTING TRACKS ON A SUBSTRATE

FIELD OF THE INVENTION

The invention relates to a method for producing conducting tracks on a substrate and in particular wire inlaid on a substrate.

It preferably relates to the production of an inlaid antenna wire for a radiofrequency transponder. The inlaid wire according to the invention has improved mechanical resistance when bending the substrate thereof.

The invention relates, in particular, to the field of radiofrequency antenna substrates such as electronic passports, travel documents, chip cards, tickets, RFID tags, radiofrequency transponders, inserts (or inlays).

Such objects can comply, in particular, with ISO/IEC 14443 or UHF standards.

PRIOR ART

It is known to modify the arrangement of the turns of a radiofrequency antenna, in particular the separation between turns in order to comply with the frequency tuning necessary for communication. It is possible in particular to provide areas of the antenna in which the turns are voluntarily separated relative to a normal distance between turns so as to provide a capacitor between turns in order to adjust to the frequency tuning.

Patent application EP2579389 (A1) solves a problem of folding resistance of the antenna. The solution consists of bringing the conducting wires closer together, at least in the identified stress area.

Technical Problem

Especially in passports, the antenna substrates made up of a sheet of the passport booklet or the cover, embrittlement points have been found during the following mechanical resistance test, which includes bending and twisting (WG3TF4_N0232_Test specifications for MPRs V3.2 § 5.7).

The technical problem is a tendency to fold antenna substrates in passport booklets. The tendency to fold in preferred folding areas corresponds to the fold lines of the previously mentioned standardised test. A first fold line corresponds to a first bisector located substantially perpendicular to a hinge of a passport booklet or another booklet or radiofrequency inlay.

A second fold line corresponds substantially to a second bisector of the passport sheet parallel to the passport hinge.

The invention aims in general to improve the mechanical bending resistance of a wire inlaid on a substrate.

The invention has the specific aim of proposing a transponder with antenna or inlay that is more resistant to the aforementioned bending and easier to implement without modifying the radiofrequency performance thereof.

SUMMARY OF THE INVENTION

The invention consists of not inlaying the tracks or wires in a substrate sheet and/or not laying or depositing, with less tension stress, the wires or tracks at least in an identified area of stress by folding the substrate sheet supporting the tracks or wires during use or during testing.

For this reason, according to a preferred embodiment of the invention, the track is an antenna wire which is unwound by a depositing head with no tension or with a lot less tension in an area substantially centred on a stress or folding axis or line mentioned above.

Furthermore, in this area, the wire can be removed in order to span the area centred on the fold above the surface of the substrate sheet. The wire is thus less exposed, in this area compared with other inlaid areas, to mechanical stress during the unwinding (or deposition) and attachment thereof to the substrate.

The invention thus can preferably relate to an antenna for a radiofrequency transponder, said antenna comprising conducting wire portions that are, to a major extent, inlaid, and conducting wire portions that are, to a minor extent, not inlaid on a planar substrate.

The antenna is characterised in that said wire portions that are, to a minor extent, not inlaid, extend over at least one preferred fold line (or axis) and/or a predefined fold line according to a standardised fold-resistance test.

Noticeably improved results in terms of resistance, for example increased by 50%, are obtained when the wires of the antenna located on and near the fold, are not inlaid during the formation of the antenna by inlaying and/or are not unwound under tension or stress in an area centred around the folds.

According to other features of the invention:
The planar substrate comprises at least one longitudinal edge, at least one preferred or predefined fold line corresponding to a bisector of the planar substrate perpendicular to the longitudinal edge;
The wire portions extend parallel relative to the longitudinal edge of the planar substrate;
The planar substrate comprises at least one transverse edge perpendicular to the longitudinal edge, and at least one preferred fold line and/or a predefined fold line extends over or around a bisector (ML) of the planar substrate, said bisector (ML) being perpendicular to the transverse edge;
Said at least one wire portion extends parallel relative to the transverse edge of the planar substrate;
The longitudinal edge is adjacent to a booklet hinge and/or said transverse edge is perpendicular to said booklet hinge.

The invention also relates to a portable electronic object including the above antenna; it can preferably constitute a passport, a booklet, the antenna being supported by a sheet or a cover of the booklet or the passport.

The invention likewise relates to a production method corresponding to the above antenna.
The method can reduce a level of tension or pulling of the conducting wire relative to a level of wire tension required for inlaying the wire, when the wire passes over a fold area or an area where the wire is not inlaid.

DESCRIPTION

Figures 1, 2:
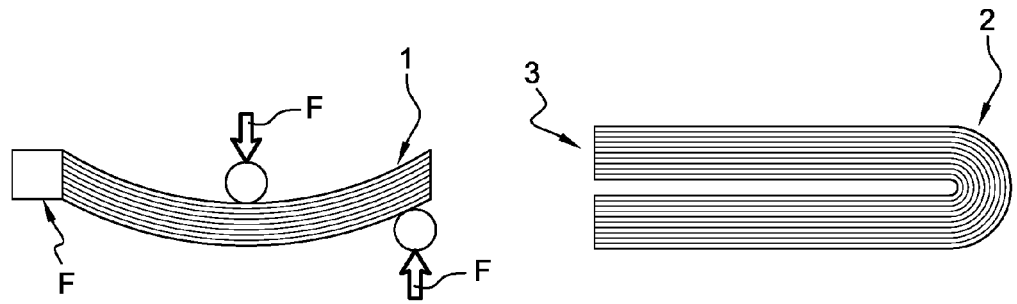
FIG. 1 depicts a bending test applied to a passport booklet.
FIG. 2 depicts the passport in profile view showing the binding 2 and the opposite edge 3.

In FIG. 1, a booklet 1 in particular of a passport is subjected to a bending test as shown in the figure by a pressure F exerted at the centre and on the edges by reaction.

FIG. 2 depicts the booklet in a profile view showing the binding 2 and the opposite edge 3.

Figure 3:
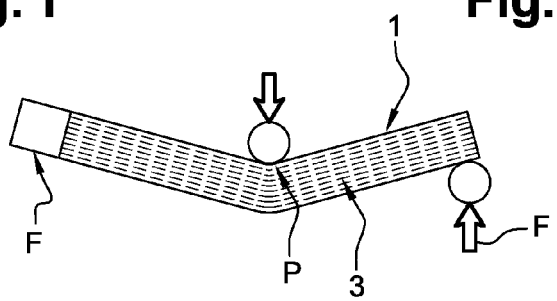
FIG. 3 depicts the appearance of a fold appearing on a transverse perpendicular bisector of the passport.

In FIG. 3, the bends of the test result in a fold P on a transverse perpendicular bisector MT of the booklet.

When the bending F is applied according to a fold line or axis perpendicular to the binding 2 (or edge 3), it begins to mark a crease P and the stress accumulates on the crease. The crease propagates in the booklet comprising the antenna substrate sheet and causes initial shearing of the antenna wires in each area 7. Then, the shearing can propagate across the entire width of the booklet until the wires of the antenna located near the edge of the booklet opposite the binding.

Figure 4:
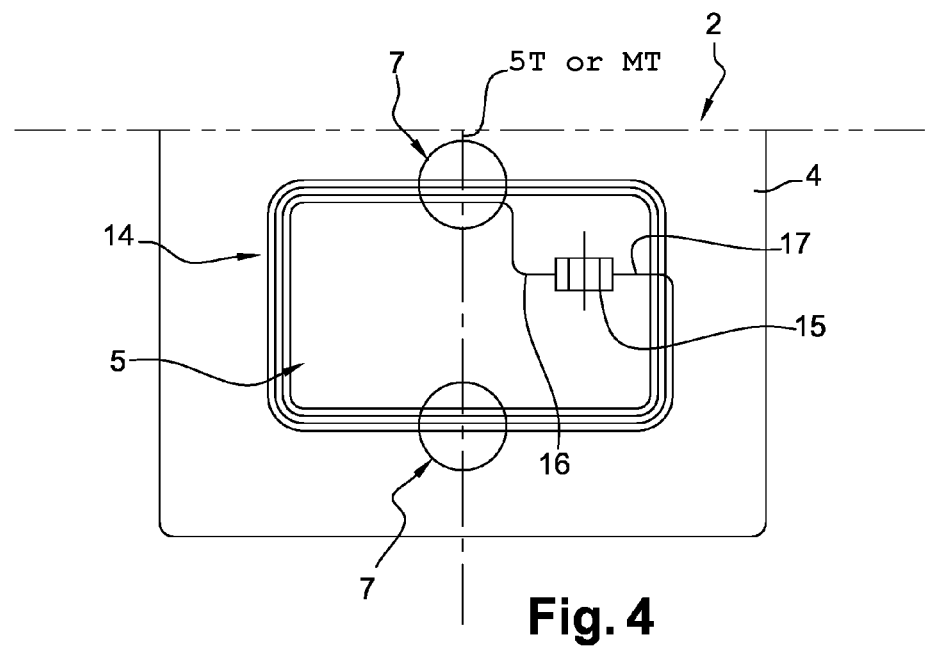
FIG. 4 depicts a transponder of the prior art comprising a spiral antenna and an integrated circuit module arranged on a passport page or cover.

In FIG. 4, a passport sheet of the prior art has a planar substrate 4 supporting a radiofrequency transponder 14, 15, a longitudinal edge 2 near the passport binding, and an antenna 14 for receiving by electromagnetic coupling 14 on the substrate. The antenna includes turns surrounding a central coupling surface. The turns extend at least partially parallel and near the longitudinal edge 2.

The antenna here is made from a wire inlaid in the substrate. The antenna is connected to an electronic micromodule comprising an RFID chip 15 via connection ends 16 and 17. Other techniques for producing an antenna which are known for a person skilled in the art may also be used, such as embroidery, transfer of a previously wound antenna, etching, etc. However, for reasons of communication performance, the invention preferably relates to wire antennas with a substantially constant section (or diameter).

The antenna can comprise at least the actual turns and the substrate. In accordance with the invention, the antenna can also be an antenna inlay or radiofrequency transponder with or without a connected integrated circuit chip. The antenna can be finished or semi-finished insofar as it can be intended for being optionally connected to one or more electrical or electronic components.

When necessary, in certain uses, in particular for an object with dual interface or a radiofrequency object with passive antenna (relay antenna), the antenna can be bare (not connected to an integrated circuit chip).

The antenna can be connected to a capacitor. The antenna can be a UHF antenna or any other, such as RFID tags.

The turns of the antenna, or at least those arranged along the adjacent edge 2 corresponding to the binding 2, have a substantially constant spacing between turns that is reduced relative to the turns oriented perpendicular to the said binding edge 2. Indeed, according to patent EP 2579389, a reduced space between turns also makes it possible to reduce the stress of said area 7.

The spacing of the last turns oriented perpendicularly to said edge of the binding 2 is, for example, currently comprised between 0.1 and 2 mm for wires with a diameter of 50 to 150 μm.

The regions 7 of the turns (or antenna wire) are located on the bisectors of the longitudinal 2 and transverse 12 edges of the regions which are particularly exposed to stress axes 5T (preferred or predefined fold line or as symbolised by an arrow F).

Figure 5:
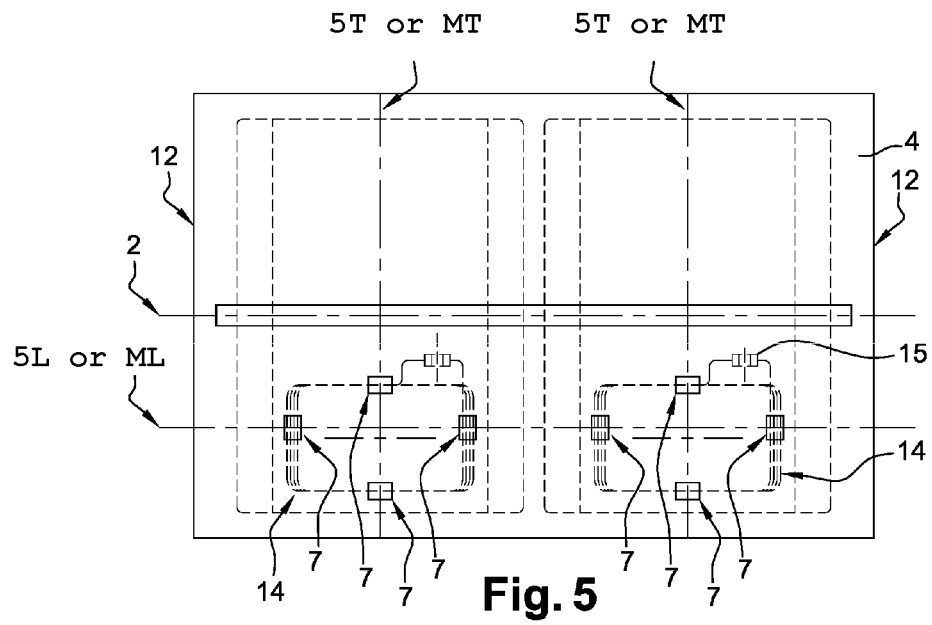
FIG. 5 depicts a planar substrate sheet with two radiofrequency antenna patterns on two passport pages prior to separation and cutting.
Figure 6:
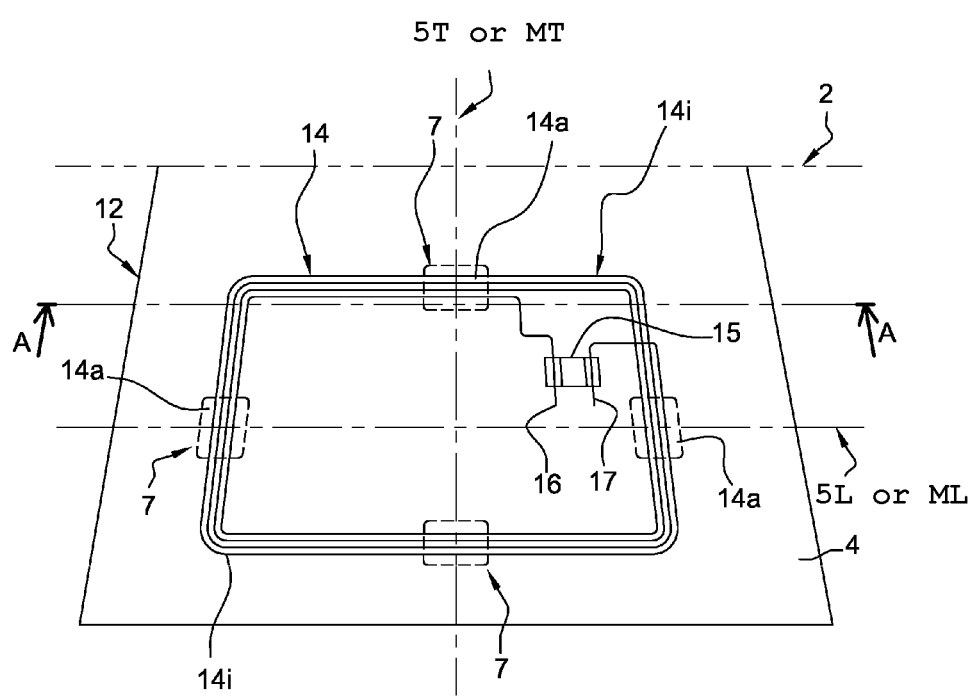
FIG. 6 depicts a more detailed view of an antenna similar to that of the preceding figure, produced according to a preferred embodiment of the invention on a planar substrate but with substantially the same spacing between turns throughout.

In FIG. 5 or 6, according to a first embodiment of the invention, an antenna substrate 4 (here in the form of a planar sheet with two antenna patterns), supports an antenna 14 extending over or parallel to one of the main surfaces thereof; the antenna substrate 4 of FIG. 6 is substantially consistent with the preceding FIG. 5 with reduced differences in the spacing between turns on the longitudinal sides of the antenna relative to the transverse sides.

The antenna can be in the form of open- or closed-loop turns for induction technology, in particular ISO 14443 or comprising straight lines, for example for UHF technology.

The substrate 4 here is a sheet for producing two inserts (FIG. 6) for a passport with two antenna patterns 14 with turns.

The substrate 2 comprises a longitudinal edge 2, intended for being parallel and adjacent to a binding 2 of a passport booklet and a transverse edge 12 perpendicular to the preceding longitudinal edge 2.

The antenna 14 here is rectangular and includes four turns or parallel (large side of the rectangle) and perpendicular (small sides of the rectangle) wires, extending parallel and perpendicular, respectively, to the longitudinal edge (2).

The antenna 14 likewise comprises conducting wire portions that are, to a major extent, inlaid 14i on the planar substrate 4. The antenna can comprise conducting wire portions which are necessarily not inlaid 14a in the planar substrate for purposes other than to limit the constraints on the wire during the folding of the substrate thereof.

For example, the antenna can include portions located at the end or start of the run of the antenna. In the example, antenna portions that are not inlaid can be located near the ends or connection terminals 16, 17 of the antenna for connecting the module 15.

These portions can also comprise free portions extending towards the ends 16, 17 of the antenna after the electrical connection to the module 15.

According to one feature of this first embodiment, the antenna also comprises wire portions that are, to a minor extent, not inlaid 14a, which extend over (or are crossed by) preferred fold lines 5T or 5L and/or predefined fold lines according to a standardised fold-resistance test.

The inlaid wires 14i are the minority relative to the wire portions that are not inlaid 14a.

These portions that are not inlaid 14a are located right at the middle of or on the run of antenna wire. In a singular manner, alternations of inlaid wire are arranged on the products according to the invention, over at least 2 to 4 cm on the antenna run, followed by non-inlaid wire over, for example, 4 to 1.5 cm.

In the example, the areas 7 comprise a plurality of parallel wires that are not inlaid, which extend out of the surface of the planar substrate 4.

The wire portions that are not inlaid 14a are thus voluntarily placed in the areas 7 during the production of the antenna. However, it is possible for these wire portions 14a to be slightly inlaid, for example up to 50%, in said substrate sheet, in particular during subsequent lamination operations with covering or decorative sheets.

The material for covering the antenna can comprise a layer of material that is softer than the substrate sheet 4 and deposited, for example, by depositing or silk-screen printing, 3D printing, jet of matter, or elastomer inkjet. This layer preferably covers at least each area 7. This layer preferably has the same height as the non-inlaid wires, so as to contain, at least to a major extent, each portion in material that is softer or more easily deformable than the substrate sheet 4 exposed to mechanical stress.

Alternatively, the wire portions 14a that are not inlaid or not embedded in the material 4 are each inlaid or embedded in a window corresponding to each area 7, but the window is arranged in the sheets 4.

Thus, the portions that are not inlaid in the sheet 4 may be subsequently embedded in portions of material that is softer or more resilient (or portions without material) than the material of the substrate sheet.

Thus for example, before inlaying, the material of the sheets 4 vertically in line with the areas 7 is hollowed out in particular by punching. The wires are inlaid by passing through the hollowed-out areas vertically in line with the areas 7, and then these areas are filled with 4M material that is softer or more resilient than that of the substrate sheet 4.

Alternatively, the hollowed-out areas vertically in line with the areas 7 are first filled with 4M material that is softer or more resilient than that of the substrate sheet 4. Then, the wire is inlaid (or an antenna track is produced) over the entire substrate, optionally also in the 4M material.

The fold lines correspond here, in the example, to predetermined fold lines or fold lines which are formed preferably on the substrate considering the configuration and/or use of the radiofrequency transponder in any given object (passport booklet, booklet cover, card, RFID travel ticket, bag wall, garment wall, box, ironing line, folding line, etc.)

According to one feature of one embodiment, the planar substrate 4 comprises at least one longitudinal edge 2, and the non-inlaying areas 7 extend over or around (in particular overlapping) a transverse bisector MT of the planar substrate, said transverse bisector MT being perpendicular to the longitudinal edge 2.

Preferably, the surface or area 7 portion is located on or extends over a transverse bisector MT of the substrate 4.

According to another feature of the embodiment, the wire portions that are not inlaid 14a extend parallel relative to the longitudinal edge 2 of the planar substrate 4. These portions 14a belong to turns that extend parallel to the longitudinal edge 2 of the planar substrate.

Generally speaking, the portions 14a can extend perpendicular to the fold lines of the substrate. However, these portions 14a may extend otherwise, for example obliquely or forming a zigzag in the area 7.

The turns in the example generally have a spacing between turns of 0.1 to 2 mm.

The wires have a diameter of 50 to 150 μm.

According to another feature of the embodiment, the planar substrate 4 comprises at least one transverse edge 12 perpendicular to the longitudinal edge 2 defined above. Moreover, preferred fold lines (or compression/tension stress lines of the antenna wires) and/or the predefined fold lines 5L extend over or correspond to a longitudinal bisector ML of the planar substrate, said bisector (ML) being perpendicular to the transverse edge 12.

According to one feature of the invention, the areas 7 are arranged around the bisectors of the antenna substrate where the fold is made.

Indeed, the bisectors MT and ML are transverse and longitudinal perpendicular bisectors of an elementary rectangular sheet 4 after cutting a sheet with multiple transponders.

According to another feature of the embodiment, the wire portions 14a extend parallel relative to the transverse edge 12 of the planar substrate 4. However, as above, these portions 14a may extend other than parallel, for example obliquely forming a zigzag in the area 7.

According to another feature of each embodiment, the longitudinal edge 2 is parallel or is intended for being parallel to a booklet binding. Here, in the example, the edge 2 is parallel because it corresponds to the binding of a passport.

According to another feature of each embodiment, the longitudinal edge 2 is adjacent to a booklet hinge and/or the transverse edge 12 is perpendicular to the booklet hinge. In the example, the edge 2 of the insert corresponds to the binding of a passport. The transverse edge 12 corresponds to one of the two side edges of a passport.

Figure 7:
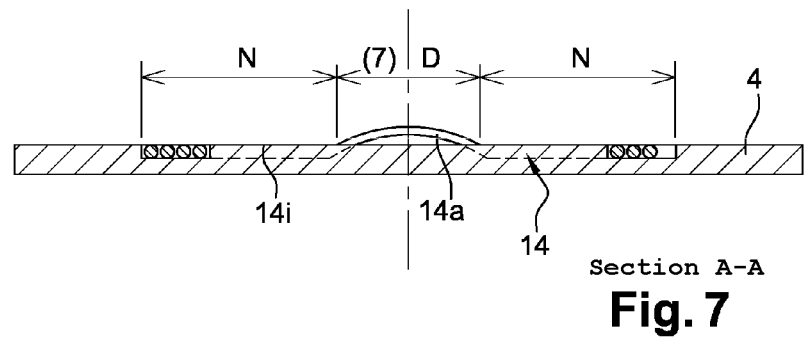
FIG. 7 depicts a section view along the A-A axis of FIG. 5.

According to another feature of the embodiment, the wire portions that are not inlaid 14a extend over a length D of 3 to 30 mm or preferably of 10 to 25 mm (FIGS. 6 & 7)

The invention can relate to any portable electronic object including the transponder described above. In particular, it can comprise a passport or a booklet, the transponder being supported by a sheet or a cover of the booklet.

Figure 8:
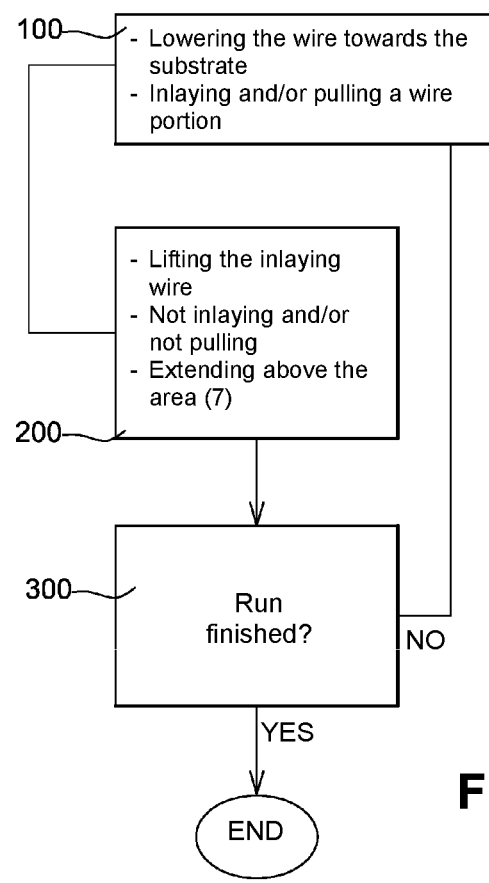
FIG. 8 depicts steps of the method according to one embodiment.

The method for producing an antenna for a radiofrequency transponder is described in connection with FIG. 8. The method consists of producing an antenna comprising conducting wire portions that are, to a major extent, inlaid 14i (over a length N), and conducting wire portions that are, to a minor extent, not inlaid 14a (over a length N) on a planar substrate (with a total of lengths N greater than a total of lengths D).

In step 100, a wire-inlaying head lowers the conducting wire towards the planar substrate in an area of the substrate located outside an area in which antenna wire is expected to fold or break, and a portion of antenna wire is inlaid, in particular by ultrasound, in the planar substrate.

Then, according to one feature of this embodiment, in a step 200, a minority portion of antenna wire 14a is not inlaid in one of the chosen areas 7 over a length D so as to be able to extend over (or pass through) one or more expected or preferred fold lines 5T, 5L and/or one or more predefined fold lines 5T, 5L (or corresponding perpendicular bisectors of the substrate MT, ML) according to a standardised fold-resistance test. Next, the wire is raised by an inlaying head, and then unwound along an area 7 or extending above said area 7.

In step 300, if the run has not ended, the method comprises further inlaying in an area of length N (FIG. 7); otherwise, the production of the antenna is ended.

According to one feature of the preferred embodiment, when the wire passes over a fold line 5T, 5L or area where the wire is not inlaid 7, the invention provides for reducing the level of tension or pulling on the conducting wire 14 relative to a wire tension element required for inlaying in portions of length N.

Indeed, during inlaying, the wire is pulled and tightened by the ultrasound head or the head for depositing the wire. Alternatively, the pulling can result from a relative movement of a work support table or transport belt relative to a wire-depositing head relative to a tension of the wire that is inlaid. One of the embodiments aims to provide softness by placing more wire length, producing a trapezoidal, rectangular or triangular profile, instead of a straight line.

According to one feature of the preferred embodiment, the level of tension or pulling on the wire is at least divided by two when the wire extends above the fold line 5T, 5L or area where the wire is not inlaid 7. In practice, not only is the pulling divided at least by two or equal to zero in this area 7, but the wire can be compressed longitudinally in this area 7, producing a loop or a slight bulge beyond the substrate in this area 7.

Next, the integrated circuit module 15 can be connected after the antenna 14 has been produced, the module being capable of being placed in a recess or cavity, during the production of the antenna or otherwise.

Next, the invention can provide for assembling final covering or decorative sheets, in particular on the antenna so as to form a finished product or an intermediate radiofrequency insert or inlay.

The insert can then be inserted into any object, in particular a passport cover, sheet or booklet.

Although described in relation with an antenna, the invention can apply to the production of metal and/or electrically conducting tracks in general, in particular by wire deposited on any given substrate.

The ratio of inlaid wire to non-inlaid wire may vary. The non-inlaid wire may be the majority fraction in certain non-preferred cases. The separation between turns of the wires is better controlled in portions in which the wire is inlaid.

The invention claimed is:

1. An antenna for radiofrequency transponder, said antenna comprising conducting wire portions that are, to a major extent, inlaid in a surface of the planar substrate and conducting wire portions that are, to a minor extent, not inlaid in the surface of the planar substrate and are not disposed in a cavity of the planar substrate, wherein said conducting wire portions that are, to a minor extent, not inlaid extend over or cross the surface of the planar substrate at at least one preferred fold line and/or at least one predefined fold line according to a standardised fold-resistance test.

2. The antenna according to claim 1, wherein said planar substrate comprises at least one longitudinal edge, said at least one preferred or predefined fold line corresponding to a bisector of the planar substrate perpendicular to the longitudinal edge.

3. The antenna according to claim 2, wherein said wire portions that are not inlaid in the surface of the planar substrate extend parallel relative to the longitudinal edge of the planar substrate.

4. The antenna according to claim 2, wherein said planar substrate comprises at least one transverse edge perpendicular to the longitudinal edge, and at least one preferred fold line and/or predefined fold line corresponds to a bisector of the planar substrate, said bisector being perpendicular to the transverse edge.

5. The antenna according to claim 4, wherein said wire portions extend parallel relative to the transverse edge of the planar substrate.

6. The antenna according to claim 2, wherein said longitudinal edge is parallel or is intended for being parallel to a booklet binding.

7. The antenna according to claim 4, wherein said longitudinal edge is adjacent to or corresponds with a hinge of the booklet and/or said transverse edge is perpendicular to said booklet hinge.

8. The antenna according to claim 1, wherein the antenna wire has a diameter of 50 to 150 μm.

9. The antenna according to claim 1, wherein the wire portions that are not inlaid extend over a length of 3 to 30 mm.

10. The antenna according to claim 9, wherein the wire portions that are not inlaid extend over a length of 5 to 10 mm.

11. An electronic portable object including the antenna according to claim 1.

12. The electronic portable object according to claim 11, constituting a passport or a booklet, the antenna being supported by a sheet or a cover of the booklet or passport.

13. A method for producing an antenna for a radiofrequency transponder, said antenna comprising conducting wire portions that are, to a major extent, inlaid in a surface of the planar substrate and conducting wire portions that are, to a minor extent, not inlaid in the surface of the planar substrate and are not disposed in a cavity of the planar substrate, comprising a step according to which said conducting wire portions that are, to a minor extent, not inlaid are produced so as to extend over or cross the surface of the planar substrate at at least one preferred fold line and/or predefined fold line according to a standardised fold-resistance test.

14. The method for producing an antenna according to claim 13, further comprising a step according to which a level of tension or pulling on the conducting wire is reduced relative to a level of wire tension required for inlaying, when the wire passes over a fold area or area in which the wire is not inlaid.

15. Method for producing an antenna according to claim 14, wherein said level of tension or pulling is at least divided by two, the wire extending over said fold area or area in which the wire is not inlaid.

* * * * *